US009722865B2

(12) United States Patent
Suerbaum et al.

(10) Patent No.: US 9,722,865 B2
(45) Date of Patent: Aug. 1, 2017

(54) DATA COMPLETION FOR MANAGED OBJECTS

(75) Inventors: Clemens Suerbaum, Munich (DE); Yves Bouwen, Herenthout (BE); Olaf Pollakowski, Berlin (DE)

(73) Assignee: Nokia Solutions and Networks Oy, Espoo (FI)

( * ) Notice: Subject to any disclaimer, the term of this patent is extended or adjusted under 35 U.S.C. 154(b) by 966 days.

(21) Appl. No.: 12/859,862

(22) Filed: Aug. 20, 2010

(65) Prior Publication Data

US 2011/0061063 A1 Mar. 10, 2011

Related U.S. Application Data

(60) Provisional application No. 61/274,834, filed on Aug. 21, 2009.

(51) Int. Cl.
*G06F 15/177* (2006.01)
*H04L 12/24* (2006.01)
*H04W 24/02* (2009.01)

(52) U.S. Cl.
CPC ......... *H04L 41/0806* (2013.01); *H04W 24/02* (2013.01); *H04L 41/0233* (2013.01); *H04L 41/0886* (2013.01)

(58) Field of Classification Search
CPC . H04L 41/08; H04L 41/0803; H04L 41/0013; H04L 41/08023; H04L 41/084;
(Continued)

(56) References Cited

U.S. PATENT DOCUMENTS 7,437,445 B1 * 10/2008 Roytman ............ G06F 11/2025
709/223
7,882,211 B2 * 2/2011 Hirsch .......................... 709/223
(Continued)

FOREIGN PATENT DOCUMENTS

CN 101321101 A 12/2008
CN 101466105 A * 6/2009
(Continued)

OTHER PUBLICATIONS

3GPP TR 32.816 V8.0.0 3rd Generation Partnership Project; Technical Specification Group Services and System Aspects; Telecommunication management; Study on management of Evolved Universal Terrestrial Radio Access Network (E-UTRAN) and Evolved Packet Core (EPC) (Release 8)—Dec. 2008—V8.0.0—pp. 1-38. http://www.qtc.jp/3GPP/Specs/32816-800.pdf.*
(Continued)

*Primary Examiner* — Anthony Mejia
(74) *Attorney, Agent, or Firm* — Harrington & Smith

(57) ABSTRACT

A method of carrying out a self-configuration process in respect of a network element in a cellular wireless network including the steps of: generating first configuration parameters at a domain manager level; determining required second configuration parameters which are not to be generated at the domain manager level; notifying a network manager level of the first configuration parameters and the second configuration parameters to cause this level to generate and provide the second configuration parameters and to provide them to the domain manager level; and using the first configuration parameters and the second configuration parameters at the domain manager level to configure the network element.

20 Claims, 4 Drawing Sheets

(58) Field of Classification Search
CPC ........... H04L 41/0843; H04L 41/08468; H04L 41/806; H04L 41/0233; H04L 41/0886; H04W 24/02; H04W 16/18; H04W 16/16; H04W 28/0263; H04W 36/14; H04W 36/22; H04W 40/02; H04W 48/08; H04W 52/244; H04W 72/0426; H04W 84/045; H04W 88/16; H04W 8/26; H04W 92/20; H04W 84/18; H04W 36/0083; H04W 72/04; H04W 72/0433; H04W 88/08; H04W 92/12; H04W 48/20; H04W 72/0406; H04W 72/1257
USPC ......... 719/316; 709/220, 221; 370/252, 331, 370/254; 455/561, 436, 434, 444
See application file for complete search history.

(56) References Cited

U.S. PATENT DOCUMENTS

| | | | | |
|---|---|---|---|---|
| 8,887,231 | B2* | 11/2014 | Wohlert | H04L 63/101 726/2 |
| 9,094,844 | B2* | 7/2015 | Morrill et al. | H04W 24/02 |
| 2005/0148368 | A1* | 7/2005 | Scheinert et al. | 455/561 |
| 2007/0143767 | A1* | 6/2007 | Attanasio | G06F 9/5061 718/104 |
| 2007/0168965 | A1* | 7/2007 | Zenz et al. | 717/121 |
| 2007/0213086 | A1* | 9/2007 | Claussen et al. | 455/513 |
| 2007/0268516 | A1 | 11/2007 | Bugwadia et al. | 358/1.15 |
| 2009/0013062 | A1* | 1/2009 | Blatherwick et al. | 709/222 |
| 2009/0092096 | A1* | 4/2009 | Czaja et al. | 370/331 |
| 2009/0129291 | A1* | 5/2009 | Gupta et al. | 370/254 |
| 2009/0170432 | A1* | 7/2009 | Lortz | 455/41.1 |
| 2009/0213758 | A1* | 8/2009 | Girolamo | H04W 24/02 370/254 |
| 2010/0261467 | A1* | 10/2010 | Chou | H04W 24/02 455/422.1 |
| 2010/0268803 | A1* | 10/2010 | Calippee | H04L 41/0843 709/221 |
| 2010/0299419 | A1* | 11/2010 | Ramankutty et al. | 709/221 |
| 2011/0045835 | A1* | 2/2011 | Chou | H04L 41/0806 455/446 |

FOREIGN PATENT DOCUMENTS

| | | |
|---|---|---|
| EP | 1031248 B1 | 8/2006 |
| EP | 1 947 811 A1 | 7/2008 |
| EP | 2 110 990 A1 | 10/2009 |

OTHER PUBLICATIONS

Henning Sanneck et al: "Network Element Auto-configuration in a Managed Network" Integrated Network Management, 2007. IM '07. 10th IFIP/IEEE International Symposium on, IEEE, PI, May 1, 2007 (May 1, 2007), pp. 497-515, XP031182724 ISBN: 978-1-4244-0798-9 p. 507 p. 510-p. 511.

Rapporteur (Clemens Suerbaum): "Introducing ARCF (Automatic Radio Configuration Function)" 3GPP Draft; 32501_CR003_(REL-9)_S5-100961_CR32501_ARCF, 3rd Generation Partnership Project (3GPP), Mobile Competence Centre ; 650, Route des Lucioles ; F-06921 Sophia-Antipolis Cedex ; France, vol. SA WG5, No. Xiamen; Mar. 1, 2010; Mar. 17, 2010 (Mar. 17, 2010), XP050440317 [retrieved on Mar. 17, 2010] the whole document.

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.00 V8.8.0, Mar. 2009, 157 pages.

"3$^{rd}$ Generation Partnership Project; Technical Specification Group Radio Access Network; Requirements for Further Advancements for E-UTRA (LTE-Advanced) (Release X)", 3GPP TR 36.913 V0.0.6, May 2008, 20 pgs.

"3$^{rd}$ Generation Partnership Project; Technical Specification Group Services and System Aspects; Telecommunication management; Self Configuration of Network Elements; Concepts and Requirements (Release 8)", 3GPP TS 32.501 V8.0.0, Dec. 2008, 17 pgs.

"3$^{rd}$ Generation Partnership Project; Technical Specification Group Services and System Aspects; Telecommunication management; Self-Configuration of Network Elements Integration Reference Point (IRP); Information Service (IS) (Release 8)", 3GPP TS 32.502 V 8.1.0, Mar. 2009, 33 pgs.

"3$^{rd}$ Generation Partnership Project; Technical Specification Group Services and System Aspects; Telecommunication management; Self-Configuration of Network Elements Integration Reference Point (IRP); Common Object Request Broker Architecture (CORBA) Solution Set (SS) (Release 8)", 3GPP TS 32,503 V8.0.0, Dec. 2008, 16 pgs.

"3$^{rd}$ Generation Partnership Project; Technical Specification Group Services and System Aspects; Telecommunication management; Software Management (SWM); Concepts and IRP Requirements (Release 9)", 3GPP TS 32.531 V9.1.0, Jun. 2009, 16 pgs.

"3$^{rd}$ Generation Partnership Project; Technical Specification Group Services and System Aspects; Telecommunication management; Software management Integration Reference Point (IRP); Information Services (IS) (Release 9)", 3GPP TS 32.532 V9.0.0, Jun. 2009, 38 pgs.

"3$^{rd}$ Generation Partnership Project; Technical Specification Group Services and System Aspects; Telecommunication management; Software management Integration Reference Point (IRP); Common Object Request Broker Architecture (CORBA) Solution Set (SS) (Release 9)", 3GPP TS 32.533 V9.0.0, Jun. 2009, 25 pgs.

* cited by examiner

DATA COMPLETION FOR MANAGED OBJECTS

This patent application claims priority under 35 U.S.C. §119(e) from Provisional Patent Application No. 61/274,834, filed Aug. 21, 2009, the disclosure of which is incorporated by reference herein in its entirety, including all Exhibits that were attached to the provisional application.

TECHNICAL FIELD

The exemplary and non-limiting embodiments of this invention relate generally to communication systems, including wireless communication systems and networks, as well as to related methods, devices and computer programs and, more specifically, relate to techniques for self-configuring network elements to achieve data completion for managed objects.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ACRF automatic radio configuration function
BTS base transceiver station
CM configuration management
DRCF dynamic radio configuration function
eNB EUTRAN Node B (evolved Node B)
EUTRAN evolved UTRAN (LTE)
IRP integration reference point
LTE long term evolution
LTE-A LTE-advanced
NMS network management server
Node B base station
OAM operation, administration and maintenance
UTRAN universal terrestrial radio access network One specification of interest that relates to a modern cellular network is 3GPP TS 36.300, V8.8.0 (2009-03), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8), incorporated by reference herein in its entirety.

FIG. 1 reproduces FIG. 4.1 of 3GPP TS 36.300, and shows the overall architecture of the EUTRAN system. The EUTRAN system includes eNodeBs (eNBs), providing the EUTRA user plane and control plane protocol terminations towards UEs (user equipment, such as cellular phones). The eNBs are interconnected with each other by means of an X2 interface. The eNBs are also connected by means of an S1 interface to an evolved packet core (EPC), more specifically to a MME (Mobility Management Entity) by means of a S1 MME interface and to a Serving Gateway (SGW) by means of the S1 interface. The S1 interface supports a many to many relationship between MMEs/Serving Gateways and eNBs.

Also of interest are further releases of 3GPP LTE targeted towards future IMT-A systems, referred to for convenience simply as LTE-Advanced (LTE-A). Reference can also be made to 3GPP TR 36.913, V0.0.6 (2008-05), 3rd Generation Partnership Project; Technical Specification Group Radio Access Network; Requirements for Further Advancements for E-UTRA (LTE-Advanced) (Release X).

A current trend in OAM (not only for mobile networks) is to use "self-X" functionalities to reduce the burden, and the operating expense, of network operators. Network elements supporting such "self-X" functionalities perform tasks which otherwise management applications or human OAM operators would need to perform.

Currently there is a work item in the standardization body 3GPP SA5 that addresses the automatic generation and distribution of radio configuration data. This new functionality, which may be referred to as a "dynamic radio configuration function" (DRCF) or as an "automatic radio configuration function" (ARCF) is intended for a use case where a new eNB is inserted into a pre-existing radio network. In this event the ARCF would be used to calculate the values of those parameters which cannot use predefined or default values, e.g., those parameters that depend on the radio network environment such as the radio configuration of the (future) neighbour cells to the new eNB.

Candidate parameters for such functionality have been identified and discussed. What have not yet been defined are the mechanisms and messages that are needed for the operation of the ARCF.

According to a first aspect of the invention, there is provided a method of carrying out a configuration process in respect of a network element comprising the steps of:
generating first configuration parameters at a configuration process level;
determining required second configuration parameters which are not to be generated at the configuration process level;
notifying a level located above the configuration process level of the first configuration parameters and the second configuration parameters to cause this higher level to generate and provide the second configuration parameters;
generating the second configuration parameters at the higher level;
providing the second configuration parameters to the configuration process level; and
using the first configuration parameters and the second configuration parameters at the configuration process level to configure the network element.

Preferably, the configuration process is a self-configuration process of the network element. It may be to produce a managed object instance of a network element.

The first configuration parameters may be parameters generated at the configuration process level by an agent. The second configuration parameters may be parameters required by the configuration process level which are generated at the higher level. The second configuration parameters may be parameters generated at the higher level by a manager.

Preferably, the configuration process level indicates to the higher level which configuration parameters need to be generated at the higher level for the network element and in addition provides any needed information for the higher level to accomplish this task.

Preferably, the configuration process level indicates to the higher level that the second configuration parameters need to be generated by sending a notification containing the first configuration parameters. The higher level may respond to the notification by sending out an operation request to provide the second configuration parameters. The second configuration may be provided via a link to a configuration file containing the second configuration parameters. The configuration process level may be able to download the configuration file using the provided link.

Preferably, the configuration parameters are generated for a new network element which is to be inserted into a pre-existing network, the configuration parameters depending on the network environment such as the configuration of other network elements which will be neighbours to the network element.

According to a second aspect of the invention, there is provided an agent capable of carrying out a configuration process in respect of a network element, the agent comprising:
a configuration entity capable of obtaining required configuration parameters required to configure the network element, capable of generating first configuration parameters at a configuration process level, and capable of determining required second configuration parameters which are not to be generated at the configuration process level; and
an interface via which the agent is capable of notifying a level located above the configuration process level of the first configuration parameters and the second configuration parameters to cause this higher level to generate and provide the second configuration parameters and capable of receiving the second configuration parameters; wherein the configuration entity is capable of using the first configuration parameters and the second configuration parameters at the configuration process level to configure the network element.

According to a third aspect of the invention, there is provided a manager capable of providing configuration parameters to be used in carrying out a configuration process in respect of a network element, the manager comprising:
an interface capable of receiving a notification of first configuration parameters generated at a configuration process level and required second configuration parameters which have not been generated at the configuration process level and capable of providing the second configuration parameters to the configuration process level in order to enable the configuration process level to use the first configuration parameters and the second configuration parameters to configure the network element; and
an automatic configuration entity capable of generating the second configuration parameters.

According to a fourth aspect of the invention, there is provided a system capable of carrying out a configuration process in respect of a network element comprising an agent according to claim the second aspect of the invention and a manager according to the third aspect of the invention.

According to a fifth aspect of the invention, there is provided a computer program product comprising software code that when executed on a computing system performs a method of carrying out a configuration process in respect of a network element, the method comprising the steps of:
generating first configuration parameters at a configuration process level;
determining required second configuration parameters which are not to be generated at the configuration process level;
notifying a level located above the configuration process level of the first configuration parameters and the second configuration parameters to cause this higher level to generate and provide the second configuration parameters;
generating the second configuration parameters at the higher level;
providing the second configuration parameters to the configuration process level; and
using the first configuration parameters and the second configuration parameters at the configuration process level to configure the network element.

Preferably, the computer program product has executable code portions which are capable of carrying out the steps of the method.

Preferably, the computer program product is stored on a computer-readable medium. In this way, it may be non-transitory in nature.

BRIEF DESCRIPTION OF THE DRAWINGS

In the attached Drawing Figures.

DETAILED DESCRIPTION

Figure 1:
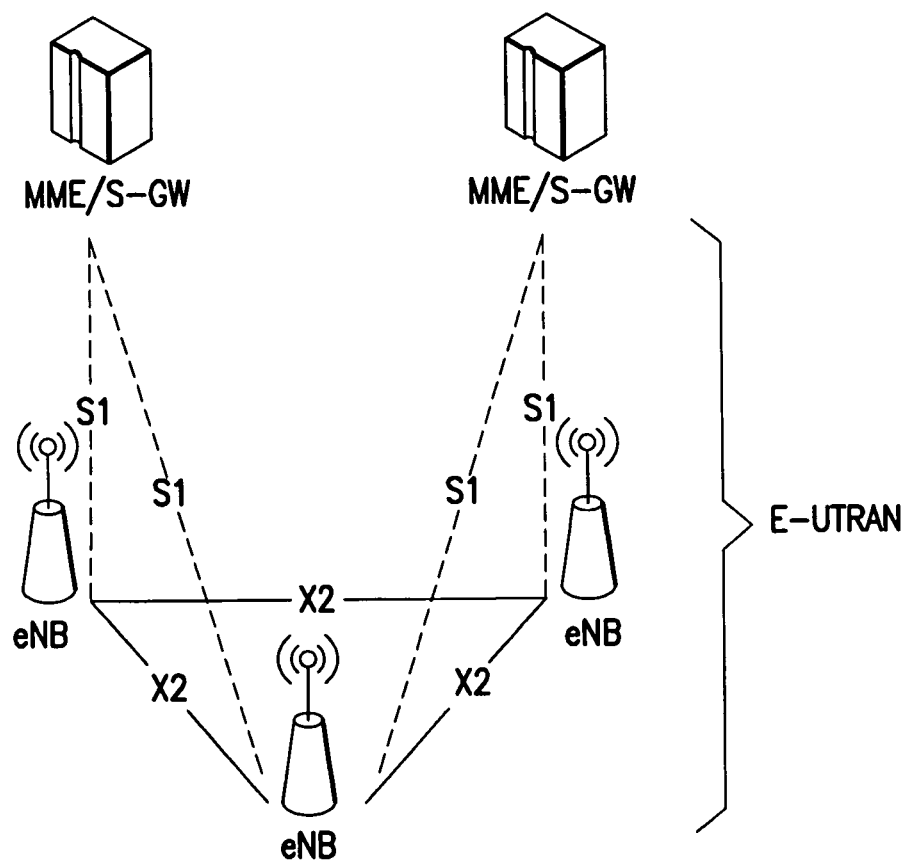
FIG. 1 reproduces FIG. 4.1 of 3GPP TS 36.300, and shows the overall architecture of the EUTRAN system.

An assumption that is made herein is that a centralized location is a preferable architecture for many of the network configuration parameters noted above. The exemplary embodiments of this invention relate to the configuration and operation of this centralized location.

3GPP SA5 has defined mechanisms and messages for self-configuration of those parameters which can use predefined or default values.

Reference can be made to the following documents with regard to 3GPP SA5:

3GPP TS 32.501 V8.0.0 (2008-12) Technical Specification 3rd Generation Partnership Project; Technical Specification Group Services and System Aspects; Telecommunication management; Self Configuration of Network Elements; Concepts and Requirements (Release 8), that was attached to the provisional application as Exhibit A, and which is also incorporated by reference herein;

3GPP TS 32.502 V8.1.0 (2009-03) Technical Specification 3rd Generation Partnership Project; Technical Specification Group Services and System Aspects; Telecommunication management; Self-Configuration of Network Elements Integration Reference Point (IRP); Information Service (IS) (Release 8), that was attached to the provisional application as Exhibit B, and which is also incorporated by reference herein;

3GPP TS 32.503 V8.0.0 (2008-12) Technical Specification 3rd Generation Partnership Project; Technical Specification Group Services and System Aspects; Telecommunication management; Self-Configuration of Network Elements Integration Reference Point (IRP); Common Object Request Broker Architecture (CORBA) Solution Set (SS) (Release 8), that was attached to the provisional application as Exhibit C, and which is also incorporated by reference herein;

3GPP TS 32.531 V9.1.0 (2009-06) Technical Specification 3rd Generation Partnership Project; Technical Specification Group Services and System Aspects; Telecommunication management; Software Management (SWM); Concepts and IRP Requirements (Release 9), that was attached to the provisional application as Exhibit D, and which is also incorporated by reference herein;

3GPP TS 32.532 V9.0.0 (2009-06) Technical Specification 3rd Generation Partnership Project; Technical Specification Group Services and System Aspects; Telecommunication management; Software management Integration Reference Point (IRP); Information Service (IS) (Release 9), that was attached to the provisional application as Exhibit E, and which is also incorporated by reference herein; and 3GPP TS 32.533 V9.0.0 (2009-06) Technical Specification 3rd Generation Partnership Project; Technical Specification Group Services and System Aspects; Telecommunication management; Software management Integration Reference Point (IRP); Common Object Request Broker Architecture (CORBA) Solution Set (SS) (Release 9), that was attached to the provisional application as Exhibit F, and which is also incorporated by reference herein.

The mechanisms and messages for the ARCF described herein are preferably compatible with the functionalities described in the foregoing standards and in further releases and enhancements thereto.

One basic problem is that self-configuration is generally capable of preparing only a portion of the data needed for a managed object instance of the standardized object model representing the new BTS (the new eNodeB). So long as the data are not complete the managed object instance cannot be created and, therefore, cannot be fully or at least partially used/managed by the OAM system.

The exemplary embodiments of this invention provide methods, apparatus, computer programs, mechanisms and messages configured to complete unfinished (incomplete) managed object instances.

Note that while the exemplary embodiments of this invention are described below in the context of ARCF in 3GPP SA5, they are not limited to only this one particular application, and are also not limited for use only with radio communication networks.

Figure 2:
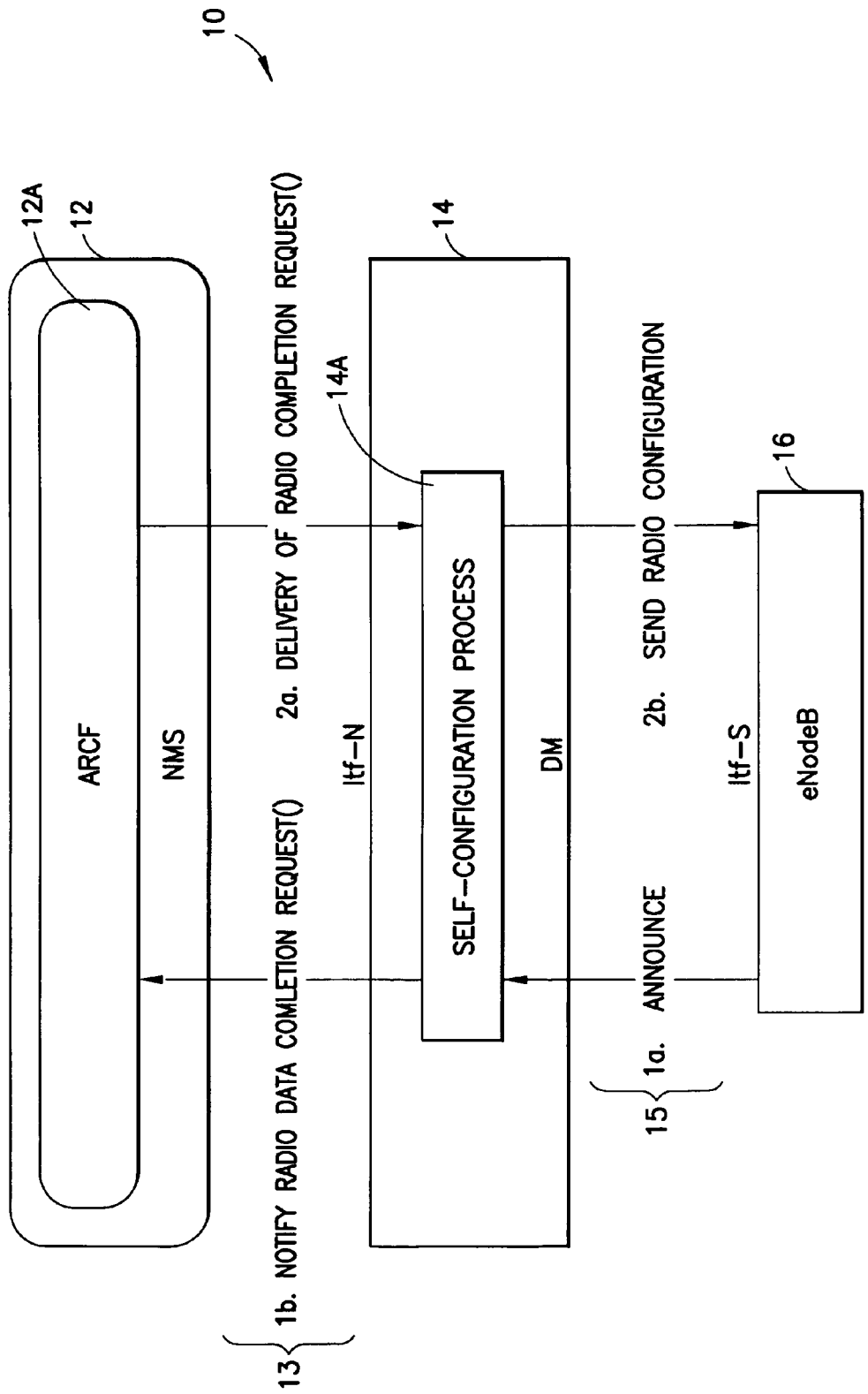
FIG. 2 shows message flow in a centralized ARCF architecture in accordance with the exemplary embodiments of this invention.

FIG. 2 depicts message flow in a centralized ARFC architecture 10 in accordance with the exemplary embodiments of this invention. The overall architecture 10 includes a network manager server (NMS) 12 that includes the ARFC 12A, a domain manager 14 that includes a self-configuration process (SCP) 14A, and at least one eNodeB 16. There are assumed to be interfaces established between these components. More specifically, there exists an Itf-N interface 13 between the NMS 12 and the DM 14, and an Itf-S interface 15 between the DM 14 and the eNodeB 16. The exemplary embodiments of this invention address with particularity the Itf-N interface 13, which may be the subject of standardization The Itf-S 15 may or may not be the subject of standardization.

It may be assumed that it is not possible to create a managed object instance if not all attributes of the object can be populated with values (unless nil values are explicitly defined, however this would not normally be the case). Hence, it is not possible to create the object instance representing a new BTS performing a self-configuration at the Itf-N 13 before all attribute values of this object are known. However, not all attribute values can be generated at the level of the DM 14. That is, certain attributes of the overall BTS radio configuration need to be generated at the level of the NMS 12 by the ARCF 12A.

It thus becomes necessary for the DM 14 to be able to indicate over the Itf-N 13 to the NMS 12/ARCF 12A that such a situation has occurred, thereby triggering the NMS 12 to generate and provide the required attribute data. This indication should preferably also have the capability to convey any information required by the ARCF 12A for the generation of the needed radio parameters (the needed attribute data).

An additional problem that arises in this context is that the NMS 12 cannot use normal mechanisms to establish the as-of-yet undefined (missing) attributes, as the related object instance does not yet exist.

The exemplary embodiments of this invention address and solve these problems by configuring the DM 14 so as to indicate to the NMS 12/ARCF 12A which configuration parameters need to be generated by the NMS 12/ARCF 12A for a specific network element (e.g., for the eNodeB 16), as well as to provide any needed information to accomplish this task.

The exemplary embodiments of this invention further address and solve the foregoing problems by configuring the NMS 12/ARCF 12A to respond to a configuration parameters request from the DM 14, to provide generated configuration parameters, and to also bind the response method to the request method.

Described below are several exemplary and non-limiting embodiments to accomplish the foregoing.

Embodiment A

Classical management interfaces are designed based on a manager-agent paradigm. In the management architecture assumed in this embodiment the agent is assumed to be located in the DM 14 (and may be referred to as an IRPAgent) and the manager is assumed to be located in the NMS 12 (and may be referred to as an IRPManager). In this context the NMS 12 cannot, by definition, invoke operations on the NMS itself.

In order then to provide the desired functionality, a notification carrying the necessary information is sent, and in the other direction a dedicated operation request with the configuration parameters and other necessary information is sent. An operation response is not required in this example.

To further explain, in a normal operation scenario: Notifications are sent from the DM 14 to the NMS 12. Operation requests are sent from the NMS 12 to the DM 14, and operation responses are sent back in the other direction. As such, "request" and "response" refer here to the direction.

In this operation scenario:
The operation request is 'misused' to transport information from the NMS 12 to the DM 14. Conceptually the operation request is a response to the notification.

In accordance with exemplary embodiments of this invention, the notifications and operations are:

a)
notification notify(Radio)DataCompletionRequest from IRPAgent to IRPManager: Requested parameters are indicated, input regarded as relevant by the IRPAgent is sent to the IRPManager.

b)
operation deliveryOf(Radio)DataForCompletionRequest from IRPManager to IRPAgent: The IRPManager returns (sends back) requested data, or indicates what relevant input is missing and/or what could not be determined.

It should be noted that if in the foregoing elements (Radio) is removed, the request/response exchange may be considered as generic to a wide range of network and system types, and is thus not limited for use with radio systems and networks.

Embodiment B

In this embodiment a notification is sent to the NMS 12. However, in the other direction a dedicated operation is not used, but instead what are used are normal CM capabilities for creating new instances of managed objects. The operations to create a new managed object instance allow specifying the values for the attributes of the object.

By way of further explanation, 'normal' CM capabilities imply functions/operations which allow the manager to create managed objects in the agent. These capabilities are normally available on management interfaces. The manager can now create a new managed object in the agent representing/modeling the newly installed BTS. In addition to this the manager can populate the object attributes with values during the object creation. These values are exactly the information/configuration the manager has created and which need to be transferred from the manager to the agent.

Embodiment C

In this embodiment the NMS 12 may also play the role of the agent and the DM 14 that of the manager. In this case the DM 14 invokes a dedicated operation on the NMS 12/ARCF 12A. The operation request sent from the DM 14 includes the required information, and the operation response sent from the NMS 12/ARCF 12A includes the configuration parameters.

Embodiment D

This embodiment may be considered as a sub-case of embodiments A, B and C. In this case the required information is sent not as an operation, but is specified in a configuration file and the request includes a reference (link) to the configuration file.

By way of further explanation, and as in the other embodiments, a notification is sent from the DM 14 to the NMS 12 and an operation request (again, it is referred to as a request because of the direction, though conceptually it is a response to the notification) is sent back. However, the operation request does not carry the generated configuration parameters but a link to a file. This file is stored by the NMS 12 in the NMS 12 or elsewhere and contains the generated notification. The DM 14 is thus enabled to download this file, e.g., via ftp, using the provided link. The use of a file to convey the generated notification is particularly beneficial in a case where, for example, the configuration is large and is not readily carried in the operation request.

Described now is a more detailed explanation to further illustrate the operation the exemplary embodiments. The implementation found below is designed for radio data. However, and as was alluded to above, by omitting the words "RadioData" from the names of the operation and notification, and removing the reference to "radio network element" in the definitions, this implementation can be generalized so as to apply to types of objects.

The following implementation pertains particularly to the Embodiment A above, but can also be readily used as well for Embodiments B and C.

The following lay-out is provided using, as a non-limiting example, a 3 GPP template for operations/notifications. The section numbering (e.g., 6.8, 6.8.1, etc,) is arbitrary, but may possibly refer to a potential numbering scheme in some future update of 3GPP TS 32.501 (that was attached to the provisional application as Exhibit A). "(O)"/"(M)" at the end of a headline specify whether the associated item is O-ptional or M-andatory (the same applies for "Qualifier" in the parameter tables. CM/CO means that a condition is applied to the optionality/mandatoriness. "Y"/"N" in the "Qualifier" column in the parameter tables determine if it is possible to filter for the associated parameter (only applicable for notifications). Also, "input parameters" of a notification is the content of the notification body (pay-load).

6.8 AutomaticRadioConfigurationInterface Interface (O)

6.8.1 Notification notifyRadioDataCompletionRequest (M)

6.8.1.1 Definition

This notification conveys information for which radio network element radio configuration parameters are requested from the ARCF.

6.8.1.2 Input Parameters

| Parameter Name | Qualifiers | Matching Information | Comment |
| --- | --- | --- | --- |
| scProcessId | M, Y | scProcessId | Identifier of scProcess |
| nEIdentification | M, Y | nEIdentification | |
| relevantParameterList | M, Y | relevantParameterList | Each entry of the list carries the attribute identifier of the relevant parameter and the parameter value. Examples of such relevant parameters are: siteId, geoLocation, hardwareId, hardwareConfiguration, siteSectorization, antennaGain, feederLoss etc. |
| requestedParameterList | M, N | requestedParameterList | Each entry of the list carries the attribute identifier of the requested parameter. Minimum size of the list is 1. |

It should be noted that the notification sent to the ARCF contains the parameters requestedParameterList and relevantParameterList. The former relates to the configuration parameters which the ARCF is to obtain and provide to the self-configuration process. The latter may relate to configuration parameters which are useable by the ARCF in order for it to generate the requested configuration parameters.

6.8.2 Operation deliveryOfRadioDataCompletionRequest (M)

6.8.2.1 Definition

This operation allows the IRPManager to deliver the data which were requested by notification notifyRadioData-CompletionRequest

6.8.2.2 Input Parameters

| Parameter Name | Qualifiers | Matching Information | Comment |
| --- | --- | --- | --- |
| notificationId | M | notificationId | Identifier of the related notifyRadioDataCompletionRequest notification |
| scProcessId | M | scProcessId | Identifier of scProcess (=same as in related notifyRadioDataCompletionRequest notification) |
| nEIdentification | M | nEIdentification | Same as in related notifyRadioDataCompletionRequest notification. |
| deliveredParameterList | M | deliveredParameterList | Each entry of the list carries the attribute identifier of the requested parameter and the parameter value |
| notDeliveredParameterList | M | notDeliveredParameterList | Each entry of the list carries the attribute identifier of the requested parameter for which no value could be determined. An empty list (size = 0) means that all requested parameter values could be delivered. |
| missingRelevantParameterList | M | missingRelevantParameterList | This list indicates which input was missing in the relevantParameterList of the related notifyRadioDataCompletionRequest notification. Each entry of the list carries the attribute identifier of the missing parameter. An empty list (size = 0) means that the input was complete. |

6.8.2.3 Output Parameters

| Parameter Name | Qualifier | Matching Information | Comment |
| --- | --- | --- | --- |
| result | M | result | result = success confirms successful reception of the data |

The following pertains to Embodiment D above:

6.8.3 Operation fileForRadioDataCompletionRequest (M)

6.8.3.1 Definition

This operation allows the IRPManager to deliver the data which were requested by the notification notifyRadioDataCompletionRequest in a file or as reference to a file.

6.8.3.2 Input Parameters

| Parameter Name | Qualifiers | Matching Information | Comment |
| --- | --- | --- | --- |
| notificationId | M | notificationId | Identifier of the related notifyRadioDataCompletionRequest notification |
| scProcessId | M | scProcessId | Identifier of scProcess (=same as in related notifyRadioDataCompletionRequest notification) |
| nEIdentification | M | nEIdentification | Same as in related notifyRadioDataCompletionRequest notification. |
| fileReference | CM*) | fileReference | Reference to a file which contains the requested parameters. *) Condition: Exactly one of either fileReference or parameterFile must be present. |
| parameterFile | CM*) | parameterFile | File containing the requested parameters. *) Condition: Exactly one of either fileReference or parameterFile must be present. |

6.8.3.3 Output Parameters

| Parameter Name | Qualifier | Matching Information | Comment |
|---|---|---|---|
| result | M | result | result = success confirms successful reception of the data |

In FIG. 2 the message flow may be as follows:

1a.) The eNodeB 16 announces its presence to the DM 14 over the Itf-S 15.

1b.) The DM 14 composes the appropriate notifyRadioDataCompletionRequest message containing the relevant parameters for the eNodeB 16 that it has knowledge of, as well as the requested parameters that it does not have knowledge of, and sends the notifyRadioDataCompletionRequest to the NMS 12 over the Itf-N 13.

2a.) The NMS 12 determines, if possible, the requested parameter values, composes the appropriate deliveryOfRadioDataCompletionRequest message, and sends the message over the Itf-N 13 to the DM 14.

2b.) The self-configuration process 14A of the DM 14 completes the needed configuration for the eNodeB 16, and sends a radio configuration message to the eNodeB 16 over the Itf-S 15, thereby provisioning the eNodeB 16 for operation in the radio network.

Figure 3:
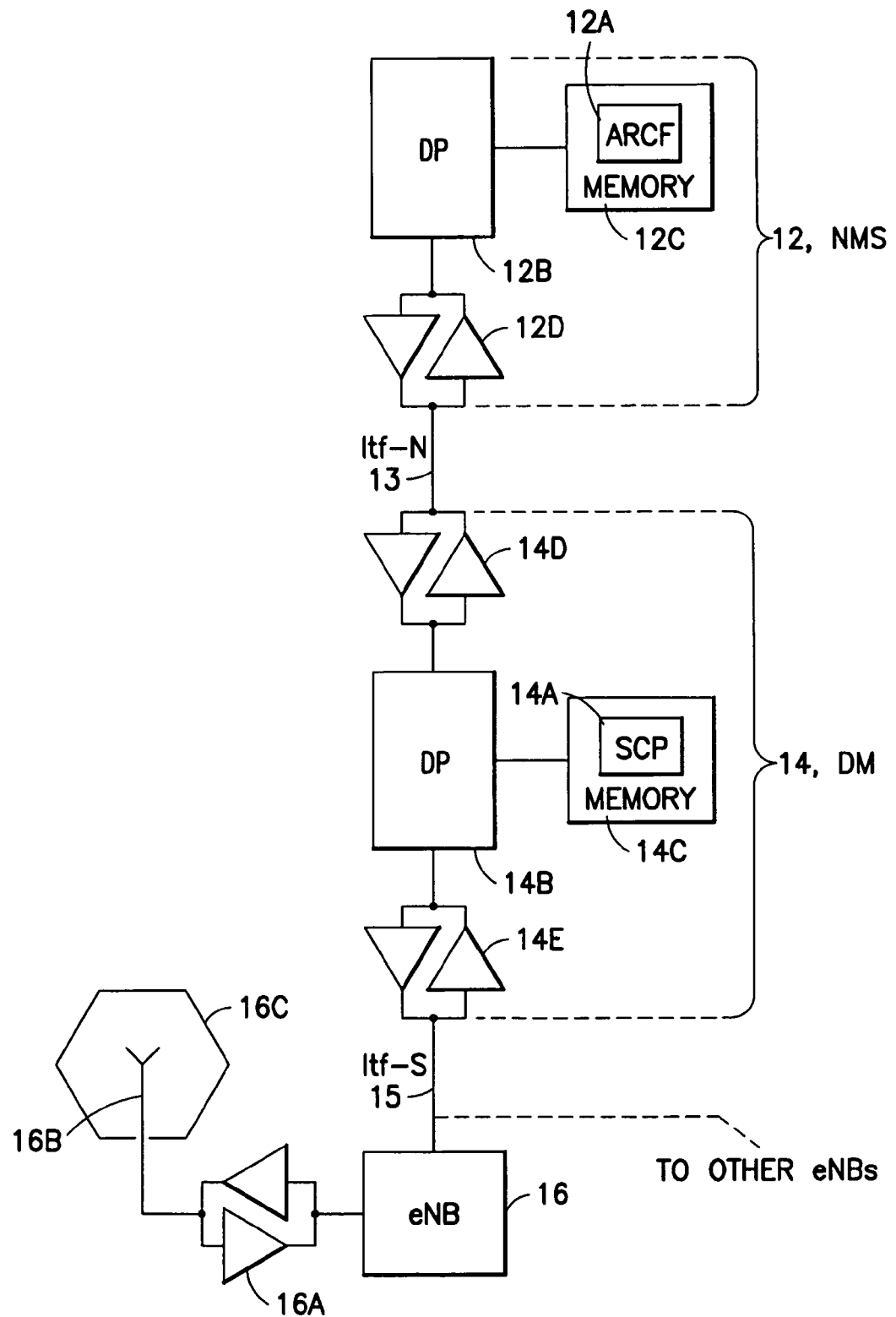
FIG. 3 is a simplified and non-limiting block diagram of the centralized ARCF architecture of FIG. 2.

FIG. 3 illustrates a simplified block diagram of various electronic devices and apparatus that represent but one suitable embodiment for use in practicing the exemplary embodiments of this invention. In FIG. 3 there is a radio network access node, such as a Node B (base station/BTS), and more specifically the eNodeB (eNB) 12 having at least one radio transceiver 16A and antenna 16B supporting at least one cell 16C. Also shown in FIG. 3 are the DM 14 and the NMS 12. The DM 14 includes a controller, such as at least one computer or a data processor (DP) 14B, a computer-readable memory medium embodied as a memory (MEM) 14C that stores a program of computer instructions, including the self-configuration process (SCP) 14A, a first interface 14D for communication with the NMS 12 over the Itf-N 13 and a second interface 14E for communication with the eNodeB 16 over the Itf-S 15. The NMS 12 includes a controller, such as at least one computer or a data processor (DP) 12B, a computer-readable memory medium embodied as a memory (MEM) 12C that stores a program of computer instructions, including the ARCF 12A, and an interface 12D for communication with the DM 14 over the Itf-N 13. The bidirectional interfaces 12D, 14D and 14E may be of any suitable type, depending on the implementation of the Itf-N and Itf-S, and may be configured for communication over electrical cable, optical fiber, or a wireless link as appropriate.

In general, the exemplary embodiments of this invention may be implemented at least in part by computer software executable by the DP 12B of the NMS 12 and by the DP 14B of the DM 14, or by hardware, or by a combination of software and hardware (and firmware).

As was noted above, in some embodiments of this invention there may be no radio-related apparatus that are needed or used, and the parameters exchanged between the DM 14 and the NMS 12 may be other than radio-related parameters.

The computer-readable memories 12CB and 14C may be of any type suitable to the local technical environment and may be implemented using any suitable data storage technology, such as semiconductor based memory devices, flash memory, magnetic memory devices and systems, optical memory devices and systems, fixed memory and removable memory. The DPs 12B and 14B may be of any type suitable to the local technical environment, and may include one or more of general purpose computers, special purpose computers, microprocessors, digital signal processors (DSPs) and processors based on multicore processor architectures, as non-limiting examples.

Based on the foregoing it should be apparent that the exemplary embodiments of this invention provide a method, apparatus and computer program(s) to provide a managed object instance of a standardized object model representing a new node of a system, where the new node may be, as a non-limiting example, a new base transceiver station of a radio communication network.

Figure 4:
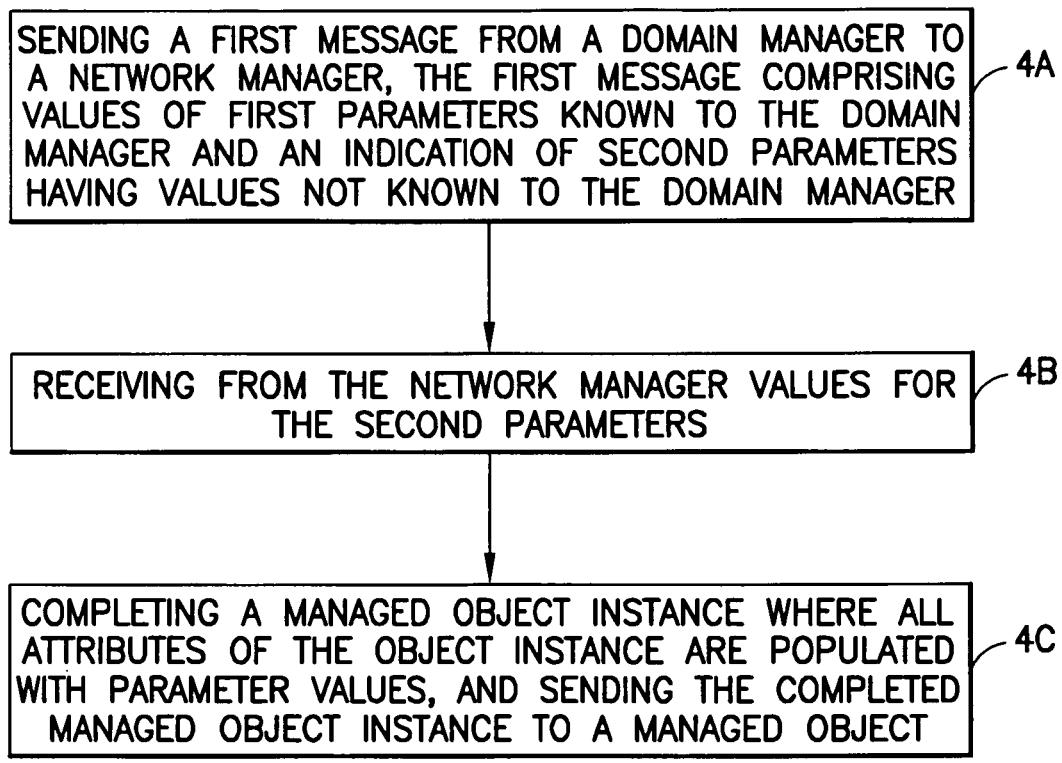
FIG. 4 is a logic flow diagram that illustrates the operation of a method, and a result of execution of computer program instructions embodied on a computer readable memory, in accordance with the exemplary embodiments of this invention.

FIG. 4 is a logic flow diagram that illustrates the operation of a method, and a result of execution of computer program instructions, in accordance with the exemplary embodiments of this invention. In accordance with these exemplary embodiments a method performs creating a managed object instance where all attributes of the object instance are populated with values, where the method includes at Block 4A sending a first message from a domain manager to a network manager, the first message comprising values of first parameters known to the domain manager and an indication of second parameters having values not known to the domain manager. The method further includes at Block 4B a step of receiving from the network manager values for the second parameters. The method further includes, at Block 4C, a step of completing the managed object instance where all attributes of the object instance are populated with parameter values, and sending the completed managed object instance to a managed object.

In the method as in previous paragraph, where the parameters comprise radio-related parameters, and where the managed object is a base transceiver station that has newly joined a radio communication network.

In the method as in the preceding paragraph, where the first message is referred to, by example, as a notify(Radio)DataCompletionRequest message, and where the second message referred to, by example, as a deliveryOf(Radio)DataForCompletionRequest message.

The method as in the preceding paragraph, where the values of the second parameters are delivered to the domain manager in a deliveredParameterList.

In the method as in the preceding paragraph, where the second parameters are delivered to the domain manager as a reference to file that contains the values of the second parameters.

In the method as in the preceding paragraph, where the second parameters are delivered to the domain manager as a file that contains the values of the second parameters.

In the method of the preceding paragraphs, where the second message contains an indication of whether all requested second parameter values could or could not be delivered.

In the method of the preceding paragraphs, where the second message contains an indication of whether any first parameter values needed to determine the second parameter values were missing from the first message.

The various blocks shown in FIG. 4 may be viewed as method steps, and/or as operations that result from operation of computer program code, and/or as a plurality of coupled logic circuit elements constructed to carry out the associated function(s).

The exemplary embodiments of this invention also encompass an apparatus comprising at least one data processor and at least one memory storing computer program code, and configured to cause the apparatus to perform the method as set forth above.

The exemplary embodiments of this invention also encompass an apparatus that comprises means for sending a first message from a domain manager to a network manager, the first message comprising values of first parameters known to the domain manager and an indication of second parameters having values not known to the domain manager, means for receiving from the network manager values for the second parameters, and means for completing the managed object instance where all attributes of the object instance are populated with parameter values, and means for sending the completed managed object instance to a managed object.

The exemplary embodiments of this invention also encompass methods and apparatus to receive the notify(Radio)DataCompletionRequest message, to determine values of the second parameters based at least in part on the values of the first parameters, and to send the second deliveryOf(Radio)DataForCompletionRequest message, where the (Radio) may or may not be present in the first and second messages.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN-LTE) and LTE-A systems, it should be appreciated that the exemplary embodiments of this invention are not limited for use with only these particular types of wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., siteID, geoLocation, etc.) are not intended to be limiting in any respect, as these parameters may be identified by any suitable names. Further, the various names assigned to different messages (e.g., notify(Radio)DataCompletionRequest, deliveryOf(Radio)DataForCompletionRequest, and message elements (e.g., relevantParameterList, requestedParameterList, etc.) are not intended to be limiting in any respect, as these various messages and message elements may be identified by any suitable names, as may the various interfaces shown in FIGS. 2 and 3. In addition, the various components, such as domain manager and network manager or network manager server may be referred to differently.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The invention claimed is:

1. A method of carrying out a configuration process in respect of a network element, the method being performed at least in part by a data processor that executes a program of computer instructions stored in a memory, the method comprising the steps of:
   generating first configuration parameters at a configuration process level associated with an agent level of a management architecture, where a manager level is located at a higher level of the management architecture than the agent level and manages the agent level, the first configuration parameters being part of a complete set of configuration parameters which are required to be applied to the network element to configure the network element;
   using the first configuration parameters and the complete set of configuration parameters to determine at the configuration process level required second configuration parameters which are not to be generated at the configuration process level and which are needed to complete the complete set of configuration parameters;
   the configuration process level providing to the manager level the first configuration parameters and notifying the manager level of the required second configuration parameters to cause the manager level to generate and provide the second configuration parameters;
   receiving at the configuration process level from the manager level the second configuration parameters generated at the manager level; and
   using the first configuration parameters and the received second configuration parameters at the configuration process level to configure the network element.

2. The method according to claim 1 in which the configuration process is a self-configuration process of the network element.

3. The method according to claim 1 in which the configuration process is to produce a managed object instance of a network element.

4. The method according to claim 1 in which the first configuration parameters are parameters generated at the configuration process level by an agent.

5. The method according to claim 1 in which the second configuration parameters are parameters required by the configuration process level to configure the network element.

6. The method according to claim 1 where the network element is comprised of a base station transceiver (BTS) that comprises part of a wireless communication network.

7. The method according to claim 1 in which the configuration process level indicates to the manager level which configuration parameters need to be generated at the manager level for the network element and in addition provides information required by the manager level to accomplish the generation of the second configuration parameters.

8. The method according to claim 1 in which the configuration process level indicates to the manager level that the second configuration parameters need to be generated by sending a notification containing the first configuration parameters.

9. The method according to claim 8 in which the configuration process level receives from the manager level, in response to the notification containing the first configuration parameters, the second configuration parameters.

10. The method according to claim 1 in which receiving the second configuration parameters comprises receiving a link to a configuration file containing the second configuration parameters.

11. The method according to claim 10 further comprising a step of the configuration process level downloading the configuration file using the received link.

12. The method according to claim 1 in which the configuration parameters are generated for a new network element which is to be inserted into a pre-existing network, the configuration parameters depending on a network environment, where the network environment is comprised at least of a configuration of other network elements which will be neighbours to the new network element.

13. An agent comprising a data processor that executes a program of computer instructions stored in a memory, the program configured to perform a configuration process in respect of a network element, where the agent is located in a management architecture at an agent level of the management architecture and where a management level of the management architecture is located above the agent level and manages the agent level, the data processor during execution of the program causes the agent to:
obtain configuration parameters required to configure the network element,
generate first configuration parameters at a configuration process level associated with the agent level, the first configuration parameters being part of a complete set of configuration parameters which are required to be applied to the network element to configure the network element;
use the first configuration parameters and the complete set of configuration parameters to determine at the configuration process level required second configuration parameters which are not to be generated at the configuration process level and which are needed to complete the complete set of configuration parameters; and
the agent further comprising an interface via which the agent provides to the management level the first configuration parameters and notifies the management level of the second configuration parameters, where the notification to the management level causes the management level to generate and provide the second configuration parameters, where the second configuration parameters are received from the management level by the agent;
wherein the configuration process level uses the first configuration parameters and the received second configuration parameters to configure the network element.

14. A manager comprising a data processor that executes a program of computer instructions stored in a memory, the program configured to provide configuration parameters to be used in carrying out a configuration process in respect of a network element, the configuration process being performed at an agent level of a management architecture, where the manager is located at a management level of the architecture above the agent level and manages the agent level, the data processor during execution of the program causes the manager to:
receive via an interface a notification of first configuration parameters generated at a configuration process level associated with the agent level and a notification of required second configuration parameters determined at the configuration process level which have not been generated at the configuration process level, the first configuration parameters being part of a complete set of configuration parameters which are required to be applied to the network element to configure the network element, and the second configuration parameters having been determined by using the first configuration parameters and the complete set of configuration parameters,
generate the second configuration parameters, and
provide the generated second configuration parameters to the configuration process level in order to enable the configuration process level to use the first configuration parameters and the second configuration parameters to configure the network element.

15. A system configured to perform a configuration process in respect of a network element, the system comprising:
an agent comprising a first data processor that executes a first program of computer instructions stored in a memory, the program configured to perform a configuration process in respect of a network element, where the agent is located in a management architecture at an agent level of the architecture and where a management level of the architecture is located above the agent level and manages the agent level, the first data processor during execution of the first program causes the agent to:
obtain configuration parameters required to configure the network element,
generate first configuration parameters at a configuration process level associated with the agent level, the first configuration parameters being part of a complete set of configuration parameters which are required to be applied to the network element to configure the network element;
use the first configuration parameters and the complete set of configuration parameters to determine at the configuration process level required second configuration parameters which are not to be generated at the configuration process level and which are needed to complete the complete set of configuration parameters; and
the agent further comprising an agent interface via which the agent provides to the management level the first configuration parameters and notifies the management level of the required second configuration parameters, where the notification to the management level causes the management level to generate and provide the required second configuration parameters, where the generated second configuration parameters are received by the agent;

where the configuration process level uses the first configuration parameters and the received second configuration parameters to configure the network element;

the system further comprising a manager located at the management level of the management architecture, the manager comprising a second data processor that executes a second program of computer instructions stored in a memory, the second program configured to cause the second data processor during execution of the second program to:

receive via a manager interface connected with the agent interface the notification of first configuration parameters generated at the configuration process level associated with the agent level and the required second configuration parameters determined at the configuration process level which have not been generated at the configuration process level, the first configuration parameters being part of the complete set of configuration parameters which are required to be applied to the network element to configure the network element, and the second configuration parameters having been determined by using the first configuration parameters and the complete set of configuration parameters, generate the second configuration parameters, and provide the generated second configuration parameters to the configuration process level in order to enable the configuration process level to configure the network element.

16. A computer program product comprising software code embodied on a non-transitory computer-readable medium, the software code when executed on a computing system at an agent level in a management architecture, where a manager level is a level above the agent level and manages the agent level, performs a method of carrying out a configuration process in respect of a network element, the method comprising the steps of:

generating first configuration parameters at a configuration process level associated with the agent level, the first configuration parameters being part of a complete set of configuration parameters which are required to be applied to the network element to configure the network element;

using the first configuration parameters and the complete set of configuration parameters to determine at the configuration process level required second configuration parameters which are not to be generated at the configuration process level and which are needed to complete the complete set of configuration parameters;

the configuration process level providing to the management level the first configuration parameters and notifying the management level of the required second configuration parameters to cause the management level to generate and provide the second configuration parameters;

receiving at the configuration process level from the management level the generated second configuration parameters; and using the first configuration parameters and the received second configuration parameters at the configuration process level to configure the network element.

17. The agent of claim 13, where the network element is comprised of a base station transceiver (BTS) that comprises part of a wireless communication network.

18. The manager of claim 14, where the network element is comprised of a base station transceiver (BTS) that comprises part of a wireless communication network.

19. The system of claim 15, where the network element is comprised of a base station transceiver (BTS) that comprises part of a wireless communication network.

20. The computer program product of claim 16, where the network element is comprised of a base station transceiver (BTS) that comprises part of a wireless communication network.

* * * * *